United States Patent Office 3,519,693
Patented July 7, 1970

3,519,693
NITRATION PROCESS FOR PHENOLIC COMPOUNDS
Ernest Albert Harvey, Franklin, Va., and James Frederick Russ, North Brunswick, N.J., assignors to American Cyanamid Company, Stamford, Conn., a corporation of Maine
No Drawing. Filed Nov. 24, 1965, Ser. No. 509,629
Int. Cl. C07c 79/26
U.S. Cl. 260—622    5 Claims

ABSTRACT OF THE DISCLOSURE

A phenolic compound, selected from phenol and m-cresol is nitrated to produce a high yield of para-nitrated phenolic compound by a process comprising (1) providing a mixed acid solution having defined concentrations of $HNO_3$, $HNO_2$ and $H_2SO_4$, (2) adding the phenolic compound to said solution in a manner to avoid formation of an oil-phase therein while maintaining the temperature of the solution at from $-20°$ to $+25°$ C., the amount of phenolic compound added not exceeding 5 moles per liter of the acid solution and the concentration of $HNO_3$ in said solution always being 1 mole per liter in excess of the phenolic compound added, and (3) recovering the para-nitrated phenolic compound product from the reaction mixture.

---

This invention relates to the nitration of phenolic compounds. More particularly, it relates to an improved and economically advantageous process for the preparation of p-nitrophenol and p-nitro-m-cresol involving the nitration of phenol and m-cresol, respectively.

The successful preparation of p-nitrophenol by the nitration of phenol with little or no o-isomer formation is a problem of long standing in the art. The method of attack for the most part has been through the preparation of p-nitrosophenol followed by its oxidation with nitric acid to p-nitrophenol. Nitrosation of phenol is known to take place predominately in the para position and oxidation of para-nitrosophenol leads to the formation of p-nitrophenol. The major drawback to this method has been that while the yield of p-nitrosophenol is good (85–92%), the subsequent oxidation to p-nitrophenol gives only fair (60%) yield due to a large amount of tar formation.

Phenol and m-cresol are, of course, readily nitrated directly. Direct nitration, however, leads to predominately the ortho isomer and the yields are poor due to excessive oxidation and tar formation. A study of the reaction by several authors has shown that the reaction is catalyzed by nitrous acid and that with nitric acid in only moderate concentration, the presence of nitrous acid was, indeed, essential to the reaction. Further, Bunton and coworkers, J. Chem. Soc., pp. 2646–2648 (1950), determined that the proportion of o- and p-nitrophenois in the product of the mononitration of phenol by nitric acid in strongly acidified aqueous solution varied with the concentration of nitrous acid, being 73 parts o-nitrophenol to 27 parts p-nitrophenol when essentially no nitrous acid was present and 9 parts o-nitrophenol to 91 parts p-nitrophenol when the ratio of $HNO_2$–$HNO_3$ was two. While the para to ortho ratios thus obtained were quite favorable, the yields of mono-nitrated products were only in the neighborhood of 70–80%, thus, being not much better than the nitrosation followed by oxidation process. Furthermore, the mono-nitrated products were contaminated with large amounts of tar so that separation and recovery of the isomer products was extremely difficult.

It is seen, then, that the known processes for preparing nitrophenols, particularly p-nitrophenols, by the nitration of phenols have attained only limited success in terms of yield of p-nitrated products obtainable thereby. These processes have, therefore, not been sufficiently attractive for commercial use. The provision of a nitration process which would be commercially useful would be an important contribution to the art. The present invention is concerned with such a process.

Accordingly, it is the primary object of this invention to provide a new and improved nitration process for the preparation of p-nitrophenols from phenol and m-cresol. Other and further objects will become evident from the following description of the invention.

It has now been found in accordance with the present invention that high yields (up to 100%) of mono-nitrated products comprised of up to 92% of p-nitrated products can be obtained by nitrating phenol or m-cresol with nitric acid in the presence of nitrous acid and sulfuric acid under a specified combination of reaction conditions. These conditions are as follows:

(1) Employing as the nitration medium an aqueous mixed-acid solution containing (a) from about 1 to about 10 moles per liter, preferably about 3 moles per liter, of nitric acid, (b) from about 0.4 mole to about 2 moles per liter, preferably about 0.9 mole per liter, of nitrous acid and (c) from about 1.7 to about 6.4 moles per liter, preferably about 2.3 moles per liter, of sulfuric acid; the mole ratio of nitrous to nitric acid in said solution being not greater than about 1.

(2) Adding the phenolic compound (reactant) to the aqueous mixed acid solution in a manner (defined hereinbelow) which substantially completely avoids the formation of an "oil phase" in the reaction mixture during the course of the reaction, said oil phase being comprised of the phenolic compound reactant and/or the nitrated phenolic compound product; the amount of phenolic compound added to said solution being such that the moles of nitric acid present per liter of said solution always exceeds by at least one mole the moles of phenolic compound added per liter of said solution; and, the total amount of phenolic compound added being no more than 5 moles thereof per liter of said acid solution.

(3) Maintaining the nitration reaction mixture formed in 2 (above) at a temperature of from about $-20°$ C. to about $+25°$ C., and under a positive pressure, i.e., from 0 to about 100 p.s.i.g.

That the above combination of reaction conditions would provide such a highly successful process for the para-nitration of the phenolic compound could not have been predicted on the basis of the prior art. Thus, as mentioned hereinabove, Bunton et al. (supra), had determined that the obtainment of a high ratio of para to ortho isomer required a high ratio of nitrous to nitric acid in the nitration reaction. They further specified only a small excess of nitric acid over phenol. Contrary to that work, however, applicants have found that an excess of nitrous over nitric acid is not only not necessary for obtainment of a high para to ortho isomer ratio, but that an excess of nitric over nitrous acid is actually advantageous for reasons indicated hereinafter. In addition, and more importantly, applicants found that a considerable excess of nitric acid over the phenol in reaction is necessary in order to limit tar formation in the reaction, a problem which Bunton et al. failed to solve. Furthermore, applicants found that the presence of an "oil phase" (comprised of either phenolic reactant or the nitrated phenolic product or both) in the reaction mass increases the formation of the ortho isomer product. To avoid this, as previously stated, applicants conduct the nitration reaction in a manner whereby the presence of an "oil phase" is eliminated. This is accomplished in one of the following ways.

(1) Aqueous or liquid phenolic compound is added to the nitration medium, slowly or portion-wise, at a rate such that it reacts substantially as fast as it is added and its solubility limit in the acid is not substantially exceeded; the addition being made while maintaining the reaction mass at a sufficiently low temperature, i.e., from −20° C. to +10° C., so that the reaction products precipitate as solids.

(2) The phenol is added to the reaction medium, slowly or portion-wise, at such a rate that it reacts substantially as fast as it is added and the solubility limit thereof in the acid is not exceeded; the total quantity of phenol added being such that at the reaction temperature, i.e., −20° C., to +25° C., the solubility of the products formed in the acid is also not exceeded.

(3) Solid phenolic compound is added at a sufficiently low temperature, i.e., from −20° C., to 0° C., so that it remains essentially solid and the reaction products also precipitate as solids.

The elimination of an oil phase in the nitration reaction in one of the aforesaid ways is an essential aspect of this invention which has not been suggested in the prior art.

It will be appreciated in connection with (1), (2) and (3) that while the temperatures designated therein overlap, the prevention of any significant "oil phase" formation is accomplished at the recited temperatures in each instance by controlling the rate of addition of the phenolic compound to the nitration medium. Thus, a slower addition rate is used at the lower portion of the temperature range in each case. In general, the time of addition can vary with successful avoidance of any significant amount of oil phase formation, over a period of from about 10 minutes to 3 hours, depending on the reactant used (phenol or m-cresol) and the temperature of the reaction. Thus, in (1) the preferred temperature for phenol as reactant is −5° C., and for m-cresol it is 0° C., the preferred addition time in each case being about 3 hours. (See Examples 1 and 14.) Addition times longer than 3 hours may of course be used, however they afford no particular advantage and are therefore not preferred herein from a practical standpoint.

In procedure (2), on the other hand, where both the phenolic reactant and the nitrated products are to be maintained in solution, the total amount of phenolic compound which can be added to the reaction is much lower than in (1), since the solubility limit of the nitrated product in the acid solution is quite low. Accordingly, higher temperatures (i.e., 10 to 25° C.) within the specified range are preferred in order to permit addition of the maximum amount of the phenolic compound without exceeding the solubility limit of the products. Although this procedure provides equally high yields of para-nitrated products on the basis of phenolic compound charged, it is less advantageous than (1) in terms of "productivity" because the amount of the phenolic compound charged is necessarily much lower.

In procedure (3) where the phenolic compound is added to the reaction medium as a solid, and the product obtained as a solid, the temperature must, of course, be sufficiently low that the phenolic compound will remain solid prior to being taken up in the reaction, i.e., not above 0° C.

The criticality and inter-relationship of the combination of the reaction conditions constituting the present invention are illustrated by Examples 1–13, the pertinent data with respect to which are summarized in Table I.

In order to illustrate the preferred procedure for carrying out the invention, Example 1 is described below in detail. Examples 2–13 were carried out in a similar fashion to Example 1, except for the variation in conditions used as shown in Table I.

TABLE I

| Temperature | Molarity of— | | | | | $HNO_3$ phenol | Time of addition | Percent yield of— | | | | Accountability percent | Remarks |
|---|---|---|---|---|---|---|---|---|---|---|---|---|---|
| | $H_2SO_4$ | $HNO_2$ | $HNO_3$ | $HNO_2$ $HNO_3$ | Phenol | | | Nitroso phenol | DNP | ONP | PNP | | |
| −5° C | 2.35 | 0.89 | 2.99 | 0.30 | 1.0 | 2.99 | 3 hrs | Trace | | 6 | 91 | 97 | Best yield. |
| 20° C | 1.98 | 0.45 | 2.11 | 0.21 | 0.52 | 4.05 | 10 min | | 1.0 | 18.7 | 80.0 | 99.7 | Good yield. |
| 20° C | 1.98 | 0.45 | 0.59 | 0.77 | 0.52 | 1.13 | 60 min | 29.6 | 4.3 | 21.8 | | 56.0 | Bad yield. |
| −10° C | 2.35 | 0.89 | 3.00 | 0.30 | 1.00 | 3.00 | 90 min | Trace | Trace | 8.1 | 85.5 | 94 | Good yield. |
| −10° C | 1.55 | 0.89 | 0.89 | 1.00 | 0.41 | 2.17 | 90 min | 56.6 | 6.6 | | | 63.2 | Bad yield. |
| 0° C | 1.70 | 0.80 | 1.80 | 0.44 | 0.5 | 3.60 | 60 min | | | 7.0 | 83.0 | 90 | Good yield. |
| 0° C | 1.70 | 0.40 | 1.00 | 0.40 | 0.5 | 2.00 | 60 min | | | 5.0 | 70.0 | 75 | Fair yield. |
| 20° C | 6.40 | 0.45 | 7.18 | 0.06 | 1.66 | 4.32 | 60 min | | 4.0 | 25.1 | 71.0 | 100.1 | Do. |
| −10° C | 6.40 | 0.89 | 2.14 | 0.42 | 1.66 | 1.29 | 60 min | 29.1 | 2.8 | 27.0 | | 58.9 | Bad yield. |
| 0° C | 1.70 | 0.40 | 1.4 | 0.29 | 0.50 | 2.80 | 60 min | | | 11.0 | 74.5 | 86 | Fair yield. |
| 0° C | 1.70 | 0.80 | 1.4 | 0.57 | 0.50 | 2.80 | 60 min | | | 7.5 | 81.0 | 89 | Better yield. |
| 0° C | 2.10 | 0.4 | 1.0 | 0.40 | 0.50 | 2.00 | 60 min | | | 12.3 | 71.2 | 83.5 | Fair yield. |
| 0° C | 2.10 | 0.4 | 1.4 | 0.29 | 0.50 | 2.80 | 60 min | | | 12.1 | 77.3 | 89.4 | Better yield. |

EXAMPLE 1

Nitration of phenol

To a 65-gallon stirred an dbaffled kettle, 249 lbs. of ice were charged and the kettle sealed. The following were then added with cooling to maintain the temperature at −5° ±2° C.:

(1) 59 lbs. of 80.5% $HNO_3$ (0.753 lb. moles)
(2) 84 lbs. of 98.0% $H_2SO_4$ (0.840 lb. moles)
(3) 29.2 lbs. of $N_2O_4$ (0.318 lb. moles)

To the above acid solution (2.35 M $H_2SO_4$, 0.89 M $HNO_2$ and 2.99 M $HNO_3$) there was added 46.6 lbs. of 80% phenol solution, (0.397 lb. moles) over 3 hours maintaining the temperature at −5° ±2° C., the product being precipitated as a crystalline solid. The reaction was heated to 250° C., and cooled to 0° C., to enlarge the crystal size and convert any remaining traces of nitrosophenol to nitrophenol. The whole was then filtered and washed with cold water, employing suction to remove the water. The wet weight of product was 67.5 pounds. Analysis showed 73.4% nitrophenol with a para to ortho isomer ratio of 16.7 to 1, or 46.9 pounds (85% yield) of para-nitrophenol. An additional 5–7% yield of para-nitrophenol was shown to be recoverable from the acid filtrate and wash water by extraction. Over-all yield of para-nitrophenol was 90–92%.

Referring now to Table I, it is seen that if any one of the reaction conditions specified in accordance with the present invention is not met a decrease in yield of para isomer and/or an increase in tar formation occurs.

In the first place, it will be observed that an excess of nitric over phenol is needed to limit tar formation. Thus, it is seen that in Example 1, where the preferred nitric acid/phenol mole ratio (2.99) was used, product accountability was 97% with 91% thereof being para-nitrophenol and only 6% ortho-nitrophenol, the remainder, only 3%, being tar.

Similarly, in Example 2, where the nitric acid/phenol ratio was 4.05, only 0.3% tar was formed. In a comparative example, i.e., Example 3, where this ratio was lowered to 1.13, tar formation was considerable, i.e., 44%. The same is true, though to a lesser degree, in Examples 5, 7, 9 and 12 where the $HNO_3$ phenol ratio was at or below the prescribed minimum of 2.

With regard to the concentration of $HNO_2$, it is seen that there where the other conditions were within the limits specified for the invention, good to excellent results were obtained both in yield and low tar formation, even though the ratio of nitrous to nitric acid was low. See Examples 1, 4 and 6. This low ratio, which is contrary to the higher ratio (2:1) called for by Bunton et al. (supra), is a distinct advantage of the present invention, because it avoids the use of high pressure and reduces practical problems with respect to the handling and recovery of nitrous acid.

With respect to the concentration of $H_2SO_4$, it will be seen that where the conditions specified for the invention are met, i.e., the employment of a molar concentration thereof in the acid solution of from 1.7 M to 6.4 M (the other conditions also being within the limits specified), excellent to fair results are obtained. In Example 5, however, where the $H_2SO_4$ concentration used, 1.55 M, was below that prescribed, i.e., 1.70 M, the result obtained was poor, tar formation being 36.8%.

With respect to reaction temperature, it is seen that good to excellent results are obtainable over the range of $-10°$ C. to $+20°$ C. (Examples 1, 2, 4, 6, 11 and 13.) It is noted that in the reaction at 20° C. at which an oil-phase has more tendency to form than in the reaction at lower temperatures, good results, are still obtained by increasing the ratio of nitric acid to phenol, as shown in Examples 2 and 8 of Table I.

With regard to pressure, it is pointed out that the reaction must be conducted under a positive pressure (i.e., 0 to 100 p.s.i.g.) in order to maintain the required concentration of $HNO_2$ therein. This is accomplished by conducting the reaction in a closed reactor capable of withstanding the nitrous acid pressure which thus accumulates in the reaction.

The following are further examples illustrative of the invention including several modifications in process procedure which may be used therein.

EXAMPLE 14

Nitration of m-cresol

To a round-bottom, three-neck flask equipped with a stirrer, dropping funnel, thermometer and Dry Ice condenser, the following were charged:

(1) 500 g. of ice
(2) 116 ml. (209 g.) of 96.2% $H_2SO_4$ [2.05 moles]
(3) 162.5 ml. (231 g.) of 70.4% $HNO_3$ [2.58 moles]

The above solution was diluted with water to 850 ml. and 49.4 ml. (73.5 g. or 0.8 mole) of $N_2O_4$ added.

To the above acid solution (2.05 N $H_2SO_4$ 3.38 M $HNO_3$ and 0.8 M $HNO_2$), there was added 1.20 ml. (123 g. or 1.1 moles) of 96–98% m-cresol dropwise over three hours while maintaining the temperature at 0° ±2°C. The precipitated solids were filtered off, washed with cold water and the water removed by suction. The product, dried overnight at room temperature, weighed 181 g. and analyzed 92% total nitro cresols and 7% water, or 166.5 g. of nitro cresols (essentially quantitative conversion). Further analysis showed that the product contained 87.4% 4-nitro-m-cresol, 5.2% 6-nitro-m-cresol and 4.7% 2-nitro-m-cresol or a para to ortho isomer ratio of 8.8.

EXAMPLE 15

Nitration of phenol

To a one-liter graduated cylinder, charge the following:

(1) 500 g. of ice
(2) 189 g. (105 ml.) of 96.2% $H_2SO_4$ [1.9 moles]
(3) 80.5 g. (56.6 ml.) of 74.4% $HNO_3$ [0.9 mole]

The above solution was diluted to 947 ml. with water at 0° C. and the whole charged to a two-liter, round-bottom, three-necked flask equipped with a stirrer, dropping funnel, thermometer and Dry Ice condenser. 37.0 ml. of cold $N_2O_4$ (0.6 mole) were then added to the solution over five minutes maintaining the temperature of reaction at 0° C.

To the above acid solution (1.9 M $H_2SO_4$, 1.5 M $HNO_3$ and 0.6 M $HNO_2$) there was added 47.0 g. (0.5 mole) of phenol dissolved in 16.5 g. of water over ¾ hour while maintaining the 0° C. temperature. The mixture was then stirred an additional 45 minutes and extracted with 240 ml. of iso-butyl acetate. It was extracted twice more with 120-ml. portions of acetate. The extracts were then combined and washed four times with 150-ml. portions of 25% brine solution. Analysis of the acetate solution showed a 85.2% yield of p-nitrophenol and a 9.0% yield of o-nitrophenol for a para to ortho isomer ratio of 9.5.

EXAMPLE 16

Nitration of phenol

In this example the required proportion of nitrous acid was provided by supplying sodium nitrate to the mixture of nitric and sulfuric acids rather than nitrogen tetroxide. Salts of the other alkali metals, i.e., lithium and potassium, may also be used.

To a 65-gallon stirred and baffled kettle, charge 266 pounds of ice and seal the kettle. The following were then added with cooling to maintain the temperature at $0° \pm 2°$ C.

(1) 64 lb. of 80.5% $HNO_3$ (0.82 lb. mole)
(2) 111 lb. of 98% $H_2SO_4$ (1.11 lb. moles)
(3) 23.5 lb. of $NaNO_2$ (0.34 lb. mole) in 35 lb. of water To the above acid solution (4.1 N $H_2SO_4$, 2.1 N $HNO_3$, 0.8 N $HNO_2$ and 0.8 N $NaHSO_4$) there was added 53 pounds of 92% phenol in water (0.52 lb. mole) over 2½ hours maintaining the temperature of $0° \pm 2°$ C. during which time the product precipitated as a crystalline solid. The reaction was heated to 30° C. and cooled to 0° C., to enlarge the crystal size and eliminate traces of nitrosophenol. The whole was then filtered, washed with cold $H_2O$ employing suction to remove the water. The wet weight of product was 73 pounds. Analysis showed a 85.1% yield of nitrophenols with a para to ortho isomer ratio of 10 to 1, or 56.5 pounds (78% yield) of para-nitrophenol. An additional 5–7% yield of para-nitrophenol was recovered from the acid filtrate and wash water by extraction. Over-all yield of p-nitrophenol was 83–85%.

EXAMPLE 17

Nitration of phenol

To a two-liter, round-bottom, three-neck flask equipped with a stirrer, dropping funnel, thermometer and a Dry Ice condenser, the following were added while maintaining the temperature below 0° C.:

(1) 750 g. of ice
(2) 180 g. of 96.4% $H_2SO_4$ (1.75 moles)
(3) 138 g. of $N_2O_4$ (1.50 moles)

To the above acid solution (3.9 N $H_2SO_4$, 2.2 N $HNO_3$ and 0.6 N $HNO_2$) there was added 120 ml. of 74% phenol in water (1.0 mole), dropwise, over 1½ hours maintaining the temperature at $0° \pm 2°$ C. When 25 ml. of the phenol solution had been added, an additional 3 ml. of 98% $H_2SO_4$ (0.05 mole) and 30 ml. of 70% $HNO_3$ (0.47 mole) were added dropwise to maintain the effective nitric acid concentration. At the end of the phenol addition, the reaction was heated to 35° C., and cooled to 0° C. The solid product was then filtered off and washed wtih cold water, the water being removed with suction. The wet weight of product was 130.3 g. Analysis showed an 88.2% yield of nitrophenols with a para to ortho isomer ratio of 9.2 or 104 g. (75% yield) of p-nitrophenol and 11.2 g. of o-nitrophenol. An additional 12.7 g. (9% yield) of p-nitrophenol and 1.9 g. of o-nitrophenol were recovered from the acid filtrate and wash water by extraction. The over-all yield was 84% of p-nitrophenol.

EXAMPLE 18

Nitration of phenol

To a 65-gallon stirred and baffled kettle, 338 pounds of ice was charged and the kettle sealed. The following were then added with cooling to maintain the temperature of 0°±2° C.:

(1) 50 lb. of 80.5% $HNO_3$ (0.64 mole)
(2) 80 lb. of 98% $H_2SO_4$ (0.80 lb. mole)
(3) 32.5 lb. of $N_2O_4$ (0.35 lb. mole)

At the end of the addition of the $N_2O_4$, the pressure on the kettle was 12–15 p.s.i.g.

To the above acid solution (4.1 N $H_2SO_4$, 2.1 N $HNO_3$ and 0.8 N $HNO_2$) there was added 53 pounds of 92% phenol in water (0.52 lb. mole) over four hours, maintaining the temperature at 0°±2° C. The reaction was then heated to 30° C., and cooled to 0° C., to enlarge the crystal size of the precipitated product. The product was then filtered off and washed with cold water, using suction to remove the water. The wet weight of product was 74.7 pounds. Analysis showed it to contain 82.9% nitrophenols with a para to ortho isomer ratio of 7.9 or 55.1 pounds (77% yield) of p-nitrophenol and 6.9 pounds of o-nitrophenol. An additional 6–8% yield of p-nitrophenol was recovered from the acid filtrate and was water by extraction. The over-all yield was 83–85% p-nitrophenol.

EXAMPLE 19

Nitration of phenol

To 500 pounds of acid solution (4.1 N $H_2SO_4$, 2.2 N $HNO_3$, 0.8 N $HNO_2$) saturated with p-nitrophenol at 0° C., in a sealed 65-gallon stirred and baffled reactor there was added 51 pounds of 92% phenol in water (0.5 lb. mole) over three hours while maintaining the temperature at 0±2° C. The reaction was heated to 30° C., and cooled to 0° C., to enlarge the crystal size of the precipitated product. The product was then filtered off and washed with cold water employing suction to remove the water. The wet weight of product was 81 pounds which analyzed 80% nitrophenols with a para to ortho isomer ratio of 7.6 or 57.0 pounds (83% yield) of p-nitrophenol and 7.5 pounds of o-nitrophenol.

Having now fully described the invention what is claimed as new and patentable is:

We claim:

1. A process for nitrating a phenolic compound selected from the group consisting of phenol and m-cresol to produce a predominantly para-nitrated phenolic compound which comprises the steps of: (1) providing an aqueous mixed acid solution containing from about 1 mole to about 10 moles per liter of nitric acid, from about 0.4 mole to about 2 moles per liter of nitrous acid and from about 1.7 moles to about 6.4 moles per liter of sulfuric acid; the mole ratio of nitrous to nitric acid in said solution being no greater than about 1; (2) adding said phenolic compound to said mixed acid solution at a rate whereby formation of an oil phase in the reaction mass is substantially completely avoided while maintaining the reaction mass at a temperature of from about −20° C., to about +25° C., and under a pressure of from 0 to about 100 p.s.i.g., the amount of said phenolic compound added being such that the moles of nitric acid present per liter of said solution always exceeds by at least one mole the moles of phenolic compound added per liter of said solution; the total amount of said phenolic compound added not exceeding 5 moles per liter of said solution; and, (3) separating the resulting nitrated phenolic compound product from the reaction mass.

2. The process of claim 1, wherein in step 2 the phenolic compound, in liquid or aqueous solution form, is added to the mixed acid solution at a rate such that its solubility limit in said solution is not substantially exceeded while maintaining the temperature of the reaction mass at from about −20°C., to about +10° C., whereby the nitrated phenolic compound product is precipitated from said solution in solid form; said product being separated from the reaction mass in step (3) by filtration.

3. The process of claim 1, wherein in step (2), the phenolic compound, in liquid or aqueous solution form, is added to the mixed acid solution at a rate such that its solubility limit in said solution is not substantially exceeded and the solubility limit of the nitrated phenolic compound product in said solution is not substantially exceeded while maintaining the temperature of the reaction mass at from about −20° C., to about +25° C.; said product being separated from the reaction mass in step (3) by solvent extraction.

4. The process of claim 1, wherein the mixed acid solution provided in step (1) contains about 3 moles per liter of nitric acid, about 0.9 mole per liter of nitrous acid and about 2.3 moles per liter of sulfuric acid and wherein the amount of phenolic compound added in step (2) is about 1 mole per liter of said mixed acid solution.

5. A process for nitrating phenol to form perdominantly para-nitrophenol which comprises (1) providing an aqueous mixed-acid solution containing about 3 moles per liter of nitric acid, about 0.9 mole per liter of nitrous acid and about 2.3 moles per liter of sulfuric acid, and (2) adding phenol, in liquid or aqueous solution form, to the mixed acid solution at a rate such that its solubility in said solution is not substantially exceeded while maintaining the temperature of the reaction mass at from about −20° C., to about +10° C.; whereby the nitrated phenol product is precipitated from said solution in solid form, the amount of phenol added being about 1 mole thereof per liter of said solution, and (3) filtering off the solid nitrated phenol product.

References Cited

UNITED STATES PATENTS

| | | | |
|---|---|---|---|
| 46,888 | 3/1865 | Eberhart | 260—622 |
| 2,868,844 | 1/1959 | Coffield et al. | 260—622 |

OTHER REFERENCES

Bunton et al., J. Chem. Soc., pp. 2646–2648 (1950).
Bunton et al., "Chem. Soc. Jour." (1950) part III, pp. 2629–36.
Wertheim, "Organic Chemistry," 1945, pp. 442, 445, 508 and 509.

BERNARD HELFIN, Primary Examiner
W. B. LONE, Assistant Examiner